US008407292B2

(12) United States Patent
Grosu

(10) Patent No.: US 8,407,292 B2
(45) Date of Patent: Mar. 26, 2013

(54) E-MAIL PROTOCOL OPTIMIZED FOR A MOBILE ENVIRONMENT AND GATEWAY USING SAME

(75) Inventor: Yair Grosu, Tel-Aviv (IL)

(73) Assignee: Comverse, Ltd., Tel-Aviv (IL)

( * ) Notice: Subject to any disclaimer, the term of this patent is extended or adjusted under 35 U.S.C. 154(b) by 819 days.

(21) Appl. No.: 10/206,954

(22) Filed: Jul. 30, 2002

(65) Prior Publication Data

US 2003/0028647 A1 Feb. 6, 2003

Related U.S. Application Data

(60) Provisional application No. 60/379,731, filed on May 14, 2002, provisional application No. 60/308,560, filed on Jul. 31, 2001.

(51) Int. Cl.
*G06F 15/16* (2006.01)
(52) U.S. Cl. ............... 709/206; 709/203; 709/201
(58) Field of Classification Search ............... 709/203, 709/205, 206, 227
See application file for complete search history.

(56) References Cited

U.S. PATENT DOCUMENTS

| | | | | |
|---|---|---|---|---|
| 5,903,723 | A * | 5/1999 | Beck et al. | 709/200 |
| 6,092,114 | A * | 7/2000 | Shaffer et al. | 709/232 |
| 6,441,831 | B1 * | 8/2002 | Abramowitz et al. | 715/716 |
| 6,505,237 | B2 * | 1/2003 | Beyda et al. | 709/206 |
| 6,629,130 | B2 * | 9/2003 | Mertama et al. | 709/206 |
| 6,687,745 | B1 * | 2/2004 | Franco et al. | 709/219 |
| 6,742,043 | B1 * | 5/2004 | Moussa et al. | 709/232 |
| 6,785,712 | B1 * | 8/2004 | Hogan et al. | 709/206 |
| 6,789,108 | B1 * | 9/2004 | McMillan | 709/206 |
| 6,871,236 | B2 * | 3/2005 | Fishman et al. | 709/246 |
| 2002/0016818 | A1 * | 2/2002 | Kirani et al. | 709/203 |
| 2002/0049825 | A1 * | 4/2002 | Jewett et al. | 709/215 |
| 2002/0138586 | A1 * | 9/2002 | Paleiov et al. | 709/207 |
| 2003/0093565 | A1 * | 5/2003 | Berger et al. | 709/246 |

FOREIGN PATENT DOCUMENTS

| | | |
|---|---|---|
| EP | 0 845 894 A2 | 6/1998 |
| EP | 1176773 A2 * | 1/2002 |
| JP | 11168498 A * | 6/1999 |
| WO | WO 00/64110 | 10/2000 |
| WO | WO 00/67436 | 11/2000 |

OTHER PUBLICATIONS

International Search Report dated Nov. 26, 2002 for corresponding International Application No. PCT/IB2002/003664.

* cited by examiner

*Primary Examiner* — Djenane Bayard
(74) *Attorney, Agent, or Firm* — Ohlandt, Greeley, Ruggiero & Perle, L.L.P.

(57) ABSTRACT

A message delivery server system for delivery of electronic content to a receiving client, comprises: a data storage for storing electronic content, a connection unit for maintaining a connection with the receiving client, and a connection establishment unit for allowing a receiving client to establish a connection with the server. The connection establishment unit comprises a definition unit for placing one or more connection definitions relating to the connection in an entity that is independent of any actual connection socket used for the session. The definition unit can be use to establish additional sockets to maintain the session and the definitions within can be used to find the best way to download media to the receiving client.

10 Claims, 17 Drawing Sheets

E-MAIL PROTOCOL OPTIMIZED FOR A MOBILE ENVIRONMENT AND GATEWAY USING SAME

CROSS-REFERENCE TO RELATED APPLICATIONS

This application claims the benefit of U.S. Provisional Application No. 60/379,731, filed May 14, 2002, and of U.S. Provisional Application No. 60/308,560 filed 31 Jul. 2001. The disclosures of both applications are incorporated by reference, herein, in their entirety.

FIELD OF THE INVENTION

The present invention relates to an e-mail access protocol and more particularly but not exclusively to such an access protocol which is especially suitable for limited bandwidth connections and optimized for a mobile environment.

BACKGROUND OF THE INVENTION

Currently there are several standard ways to access or send email messages, and current methods use a network mailbox, to which a client device logs on for access. Example protocols include POP, IMAP and SMTP. There are also several proprietary protocols in use.

Generally, email messages are stored in a storage server, to which the intended receiver logs on to retrieve or access them. POP and IMAP allow a user to view a message whilst it is located in the message store. SMTP is a protocol for sending e-mail messages.

Throughout the current art, the email access procedure is the same no matter what kind of end terminal accesses the mail and no matter what the current networking capacity or link capacity. Nevertheless, the downloading terminal may be any one of a range of terminals connected over any kind of link and may range from a cellular telephone connected over a bandwidth-limited cellular network to a personal organizer or PDA to a desktop computer connected over a high bandwidth digital link.

Generally, most terminals are capable of handling and displaying a certain amount of textual content. However not all terminals are suitable for the file sizes needed to display even a moderate length e-mail message. Often, as with a mobile telephone, the lack of suitability is due to the terminal's limited display size, unwieldy user interface and lack of sufficient memory.

Most terminals are capable of transferring e-mail messages within a reasonable time frame, and mobile terminals can also achieve reasonable performance as long as the message is purely text. Problems arise when files, such as word processing documents of considerable size or multimedia files, are attached to e-mail messages. In addition, displaying or playing multimedia files on mobile devices pose problems due to the lack or insufficiency of appropriate device resources. Multimedia files may require format and dimension conversion in order to be successfully played on a mobile device. For example, typical cellular telephones have very little capacity to handle multimedia files, and bandwidth limited links may be unable to transfer such files in a reasonable amount of time. Furthermore, the kinds of multimedia files that cellular telephones are able to handle are limited in any case. The mobile device may also have limited storage and display capabilities. Additionally, the device may not always have the required software to display all of the content types within a message (e.g. a Powerpoint™ presentation requires a Powerpoint™ "player"). Furthermore, the basic protocols in use, such as IMAP & POP protocols, cannot provide information about the capacity of a link or a receiving terminal. Limitations in storage capacity at the receiving terminal may, for example, make it difficult to download data for subsequent offline viewing. However, both IMAP and POP deliver an exact copy of the stored message, regardless of the receiving device or link capacity.

Further difficulties with the current art may include requiring a socket connection to be kept open for the duration of a session. The IMAP and POP protocols usually download an entire message, i.e. the e-mail text, as a single block, although attachments may be downloaded separately.

In many cases, a user logs on, establishes a socket connection, downloads material related to a first e-mail message, then spends the next few seconds or minutes reading the material before she/he attempts a second download. Because the user does not log off while reading the material from the first e-mail message, the socket connection remains open, albeit inactive, and network connection resources are, therefore, wasted. If the socket connection is ended, then the session ends and the user is required to log on again and may need to repeat certain steps in order to resume operation from the previous, ended, session. This poses an inconvenience to the user, because some or all of the session operations must be repeated. Furthermore, current e-mail architectures, such as IMAP & POP, make it difficult to perform any form or processing on the e-mail message prior to its arrival at the recipient. For example it is difficult to arrange the e-mail to accord with requirements set by the recipient, for example text to speech or language translation. A reason for this is that the mail protocol level does not allow for any recognition of the end user except as an address that pulls the message.

SUMMARY OF THE INVENTION

It is an object of an embodiment of the present invention to enable a source of an electronic data transfer to obtain identification information or settings from a receiving terminal so that the source is able to modify data prior to transmitting the data to the receiving terminal. Preferably, the settings include information about the receiving terminal's capabilities and requirements, so the data can be modified such that the receiving terminal can handle the data.

Additionally or alternatively, it is an object of the present embodiments to provide session data that is independent of a connection socket, so the session is not limited to a single connection socket, but the session may comprise numerous connection sockets, which are established and abandoned as desired. Alternatively or additionally, using such independent session data, it is desirable that the session can be recovered following inadvertent or unexpected loss of the socket.

According to a first aspect of the present invention there is thus provided a data delivery server system for delivery of electronic content to a receiving client, said system comprising: a data storage for storing said electronic content, a connection unit for maintaining a connection with said receiving client, and a connection establishment unit for allowing a receiving client to establish a connection with said server, said connection establishment unit comprising an autonomous definition unit for placing at least one connection definition relating to said connection in an entity independent of said connection unit.

This and further aspects of the present invention are as stated in the appended claims.

BRIEF DESCRIPTION OF THE DRAWINGS

For a better understanding of the invention and to show how the same may be carried into effect, reference will now be made, purely by way of example, to the accompanying drawings, in which.

DETAILED DESCRIPTION

Figure 1:
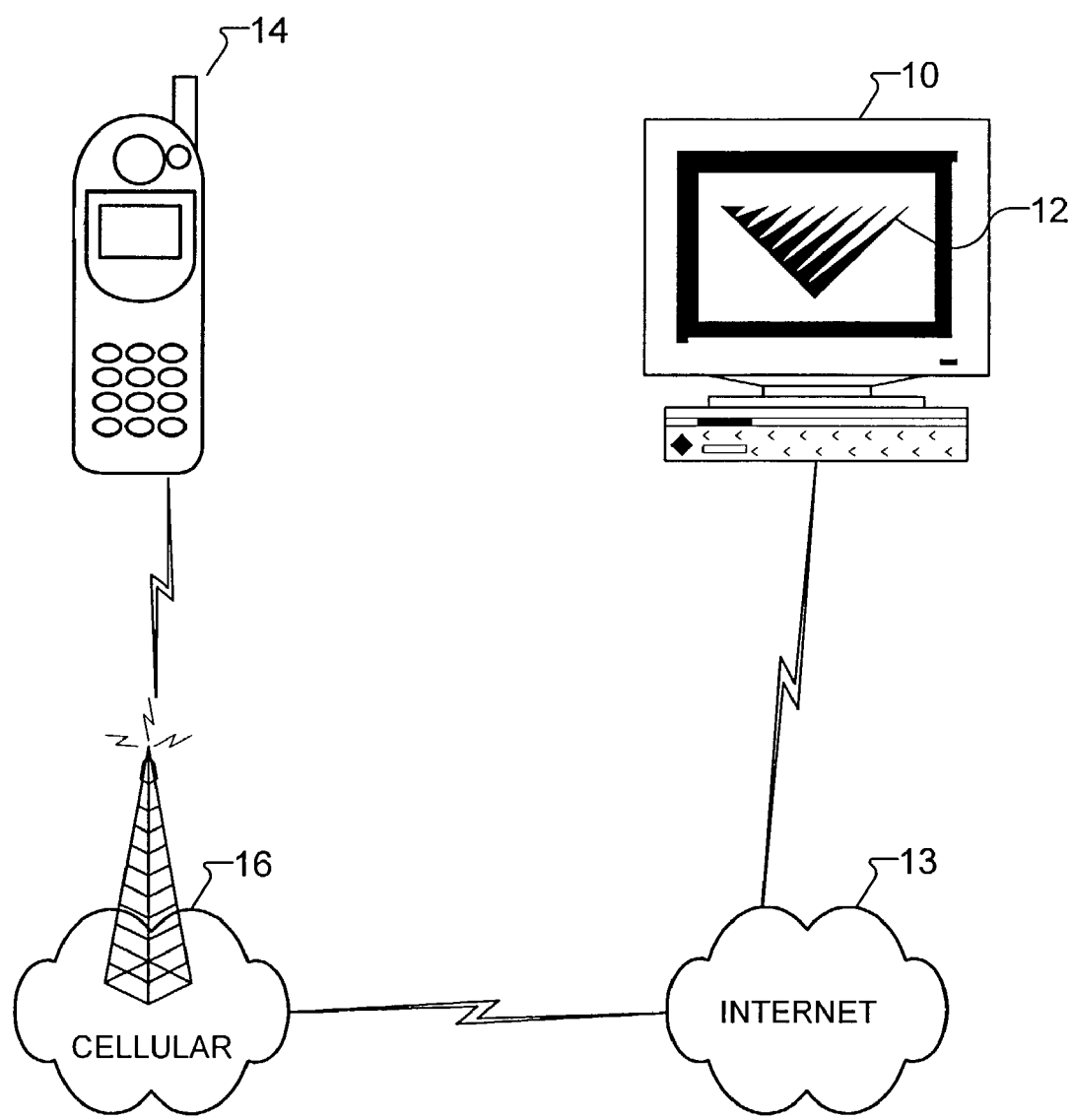
FIG. 1 is a simplified diagram showing a possible email connection path.

The embodiments to be described comprise an email protocol or an apparatus for managing electronic data download or a method for the same in which a session between a network download source and a user client is maintained using a definition ID, which may be regarded as a cookie-like mechanism.

The user client terminal may identify itself to the download source in any manner understandable by the server. Identification of the client terminal may occur when logging in, when fetching the first message or at any other time deemed suitable by the skilled person. Identification of the user client is made available to the download protocol layer so that it can be used as necessary to modify email and attached files. The protocol has a series of commands to address the adaptation issues.

Identification is carried out to determine who the user is, what his limitations are and what his preferences are. A protocol for use in the present embodiments comprises a definition set, which allows any data relevant to the above-described identification to be provided, in a uniform fashion. The definition set comprises a series of defined fields, a few of which may be required and most of which are optional. The fields may for example include a terminal type—e.g. PC, and mobile telephone, and may also include a connection type, or a limit on maximum file size, or the desire of the end user to have all his text translated into Russian, or in principle any type of requirement for data modification.

In a preferred embodiment the protocol layer determines the type of connecting device in addition to the user-name and password.

Additionally or alternatively, the definition set, also referred to herein by the term "settings", is independent of any individual connection socket, allowing a session to be independent of such a socket and thereby to persist over multiple sockets, as will be explained in more detail below.

In the present specification, the term HMAP, meaning HTTP-based mail access (including sending) protocol, is used in reference to a protocol according to one preferred embodiment of the present invention.

In existing IMAP and POP protocols, a copy, usually but not always a complete copy, of a stored message is automatically downloaded to a client when a user instructs the client to fetch the message. By contrast, in the present embodiments, the mail server is able to determine terminal type of the receiving client, and thus it is possible, as will be explained in detail below, to adapt e-mail messages and associated attachments to suit the receiving client type. Hence, for example, a mobile terminal having a 10×40 character screen and who thus cannot usefully display an entire Word document, but may be able instead to display a shorter text, may, through the above described identification, obtain as a download a portion or summary of the document, such as a table of contents. An additional advantage of the HMAP gateway as described herein is that it is able to overcome problems specific to the behavior of the wireless channel by means of appropriate management of the session. For example since the HMAP gateway knows from the identification that it is connecting via GPRS, and therefore over a wireless link, it may reduce or otherwise adapt the packet length to ensure the packets reach their destination.

Reference is now made to FIG. 1, which is a simplified diagram showing a computer 10 displaying an image 12. The computer 10 is connected to the Internet 13, through which it is able to send data to other users of the Internet. It is desired to send image 12, preferably via electronic mail (e-mail) to another user of the Internet, who, not necessarily with the knowledge of first computer 10, has connected using a mobile telephone 14 via the cellular network 16. The cellular network has a lower capacity for carrying multimedia data such as images, audio and video, and may even have difficulty carrying formatted text documents and transferring them within a reasonable time frame. In addition the mobile telephone only has limited memory and display capacity. The existing protocols for sending mail do not allow the sending terminal to contact the receiving terminal to find out about its capacity limitations before sending the message and therefore, unless the sending terminal already knows what kind of terminal the receiving terminal is, it is unable to tailor the message to the receiver's capacity. More particularly, Email protocols rely on the email server as an intermediate mailbox—emails are sent to the server, and the recipient retrieves them from the email server. There is no direct originator-recipient connection, but rather the email is sent from the sender's e-mail server to the receiver's email server, and the email remains in the receiver's email server until the receiver connects to his email server and downloads the email.

Figure 2:
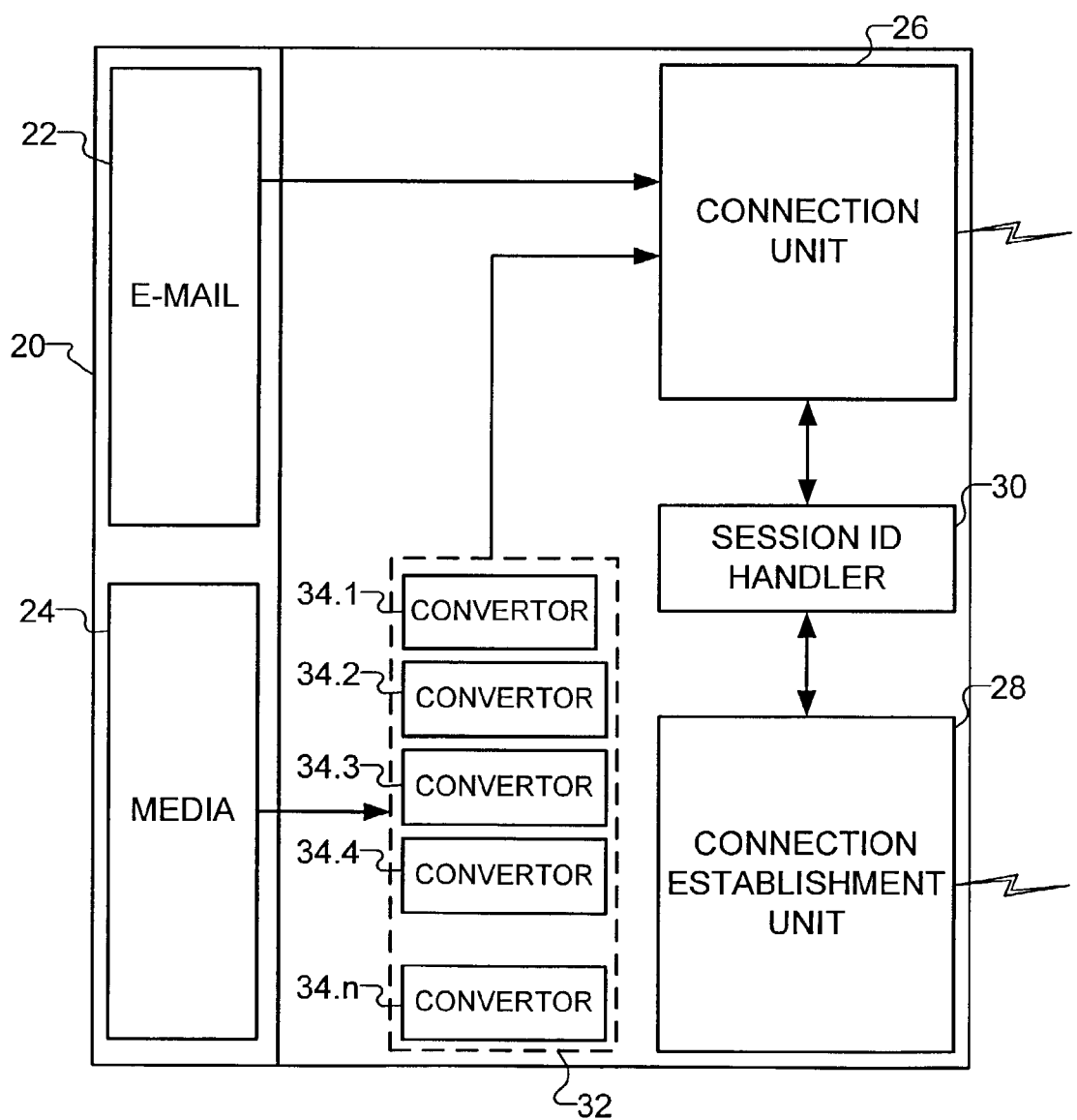
FIG. 2 is a simplified block diagram showing a server for supporting a mail protocol according to a first embodiment of the present invention (hereinbelow an HMAP server)

Reference is now made to FIG. 2, which is a simplified block diagram showing a mail serving arrangement according to a first embodiment of the present invention for sending data items in a situation in which there are limitations on sending bandwidth or on the technical capacity of the receiving terminal device. In the present embodiment, an ability is added to a data download source, such as the receiver's mail server or mail gateway, or to a proxy to the mail server or like locations, to identify the terminal type. Thus, when the terminal requests download of the data, the embodiment is able to modify the file in accordance with the receiver's capacity.

In FIG. 2, a data storage area 20 stores incoming mail messages in a mail message part 22 prior to download by the receiving terminal. The mail messages and file attachments are generally stored separately, which is to say the attachments are preferably stripped from the mail messages and removed to a media storage part 24.

It will of course be appreciated that the storage mechanism in the email server is not, however, important since an email server may store material in any way it wishes, although usually the internal data storage division is as illustrated. The attachments are replaced in the e-mail body by URLs that lead to the respective locations in storage of the attachments, and the user is able to invoke any of the URLs to obtain the corresponding attachment when desired. In a preferred embodiment, a single attachment may be represented by a plurality of URLs, one to request the entire attachment and others to request the attachment as processed in different ways. For example a color picture may be requested in its entirety via one URL, at a lower resolution via another URL and in black and white by a third URL. A connection unit 26, is connected to e-mail part 22, and the connection unit 26 maintains a connection with a receiving client. The e-mail body is typically sent as is to the receiving client via the connection.

The receiving client logs in and establishes a connection via the connection unit 26. Logging in of the receiving client is handled by a connection establishment unit 28, which carries out a log-in handshake procedure in a conventional manner, including requesting a user name, a password, and optionally determining the maximum connection speed or connection quality of service QoS. The QoS is preferably a composite of variables affecting the connection, for example speed, bandwidth, round trip delay etc. The maximum connection speed is generally used in the physical management of the connection and may for example be taken into account when determining default settings for adapting download content. As will be described below, settings such as a maximum file size to be downloaded, may be provided as defaults, and the defaults may be overridden by the user. A further example of the making of a default setting for a connection is to use a default maximum download time. The maximum connection speed is used in each case to determine a maximum file size that can be downloaded in the default download time. Then any image file that exceeds the calculated maximum file size is reduced in resolution or converted to grey scale or the like. Any text file that exceeds the maximum file size is stripped out, stored and replaced with a URL as described above.

In order to achieve an HMAP connection of the kind described above, in addition to the conventional log-in procedure, the connection establishment unit 28 preferably asks the receiving client for additional setting information, possibly including a terminal type identification. The log-in procedure is generally automatic The receiving client may for example identify itself as a mobile client. For example the receiving client may specify the client model e.g. Nokia™ 9210, the protocol, e.g. HMAP SW version, and the connection method e.g. GPRS, GSM, CDMA. Alternatively or additionally the receiving client may identify the connection as one via the cellular network. Alternatively or additionally the receiving client may provide file download settings such as a maximum acceptable file size. The file download settings may be general or may be specific to different file types. The settings may be user-selected, or they may be selected on the basis of the memory, processing or display capacity of the terminal unit or they may be selected on the basis of available connection bandwidth or any combination of the above.

The settings are preferably obtained during the login procedure, or, as mentioned above, at any other suitable time such as during download of a first message. The identification is then incorporated into a session ID, which is a small software unit, similar in kind to a cookie, which contains the settings obtained during the login procedure in a manner which is independent of the current connection socket which the session happens to be using. The session ID is preferably handled by a session ID handler 30. Thus a given user making a connection has a given setting or settings for each of his connections or for each time he connects. If the same user subsequently connects using the same login details or account name but with a different type of terminal, then he is able to supply different settings during the login procedure.

As the session ID is independent of the connection socket, it allows the session to be reestablished in the event of loss of the connection socket and also it allows a connection socket to be closed down when not in use or when a given task is finished and a new socket to be opened as required, thus saving on computing resources.

Subsequently, the user receives his e-mail in the normal way. The attachments are typically replaced by URLs as described above and the user obtains an attachment by selecting the respective URL. Typically the URL is not itself shown on the screen but is replaced by a descriptive name of a corresponding modification operation, such as View $1^{st}$ page, View Table of content, View as text and so forth, and the client invokes the respective URL by selecting the descriptive name. It is noted that the URL is internal to the implementation so that the user is not aware of the presence of the URL. Preferably, as mentioned above, a single attachment may have several selectable modifications, each corresponding to a different one of various available retrieval methods: e.g. for video, one may have one URL for downloading the original, and one may have an additional URL for streaming the data to the device. The attachment may be accessed using the URL via a converter unit 32, the URL providing the appropriate modification by activating the converter unit 32 to carry out the modification selected. The converter unit is additionally connected to the session ID handler 30, from which it is able to obtain the user selected URL or the modification settings contained therein. In operation, the user requests a particular media file by selecting the respective URL. The media file is preferably pulled from the mail server or other data storage 24 via the converter unit 32.

The file is then modified in the converter unit 32 using the definitions of the respective user connection (which may be referred to herein as "the connection definitions"), which are obtained from the handler 30 (which may be thought of as a connection definition unit). For example, a 140 k color image file may have been included in an e-mail, which is now being downloaded by the recipient using a portable telephone. The portable telephone does not have the capacity to store a 140 k image nor to show color or high resolution. That is to say the resolution available at the mobile device simply is simply insufficient for such an image. In the prior art, the client usually reduces the image when displaying, to a resolution level that it can handle, however, the full resolution image is initially downloaded, taking up time and bandwidth. In many cases the user may prefer not to download the file since the download may take time and the end result may be of limited use. By contrast in the present embodiments, the server carries out the reduction, thus providing the above-described advantages. The URL corresponding to the selected action may thus define for example, a file size limitation of 4 k, a color restriction to black and white, and low resolution. The converter therefore takes the settings and uses them to convert the image to a black and white low-resolution outline or thumbnail image of a size that may fit on the screen of a typical portable telephone.

In a preferred embodiment, the converter unit 32 comprises a series of converters 34.1 . . . 34.n, each suitable for a different file type. For example there may be converters for images, compressed images, video, compressed video, audio, compressed audio, text files of different kinds etc. Such converters may be referred to as "media converters". It will be appreciated that such converters may take attachments and produce corresponding converted attachments for delivery. Preferably, the conversion deals not only with converting the media for the client settings or capacity but also deals with sending the media in a specific protocol according to the media and receiving terminal. As an example of conversion, text or document files are often produced by particular word processing programs and comprise large amounts of formatting data. The converter may therefore usefully replace the formatting data with lower level formatting commands which the type of operating system or browser found on a digitally enabled mobile telephone is able to manage. In order to make such a replacement, however, the converter should preferably know what type of terminal is being used at the receiving end.

In a particularly preferred embodiment the media may be served using different sending protocols as best suited for the media in use, as well as for the terminal type. For example an attachment may be identified as a video clip and sent using streaming protocols. Streaming protocols are ideally suited to video as well as other types of multimedia, requiring less bandwidth and less temporal storage on the client device. These and similar conversions may be said to be performed based on the connection definition settings reflected in the connection definition, and the unit that performs the determining of the file type (and the available modifications for that file type based on the connection definition) may be said to be a definition availability device.

By contrast the regular email solution is to download an entire clip to the client and then play it only when the entire clip has arrived. Such downloading causes delay and requires storage on the client of the entire clip.

It will be appreciated that the server of FIG. 2 can be implemented in additional ways. It may for example also be implemented as a gateway. In such a deployment, the data storage 22 is not part of the gateway, but is located at the mail server in the normal way.

In one way of using such a terminal adaptive mail delivery system, the recipient may check the message more then once. Thus, for example when on the road, he may see via his mobile telephone, that there is a new message and may select for download a quick preview of the first page. He may then decide, from the preview, that the message is important and subsequently, when he reaches his fixed unit, he may download the full email on the PC as well.

Figure 3:
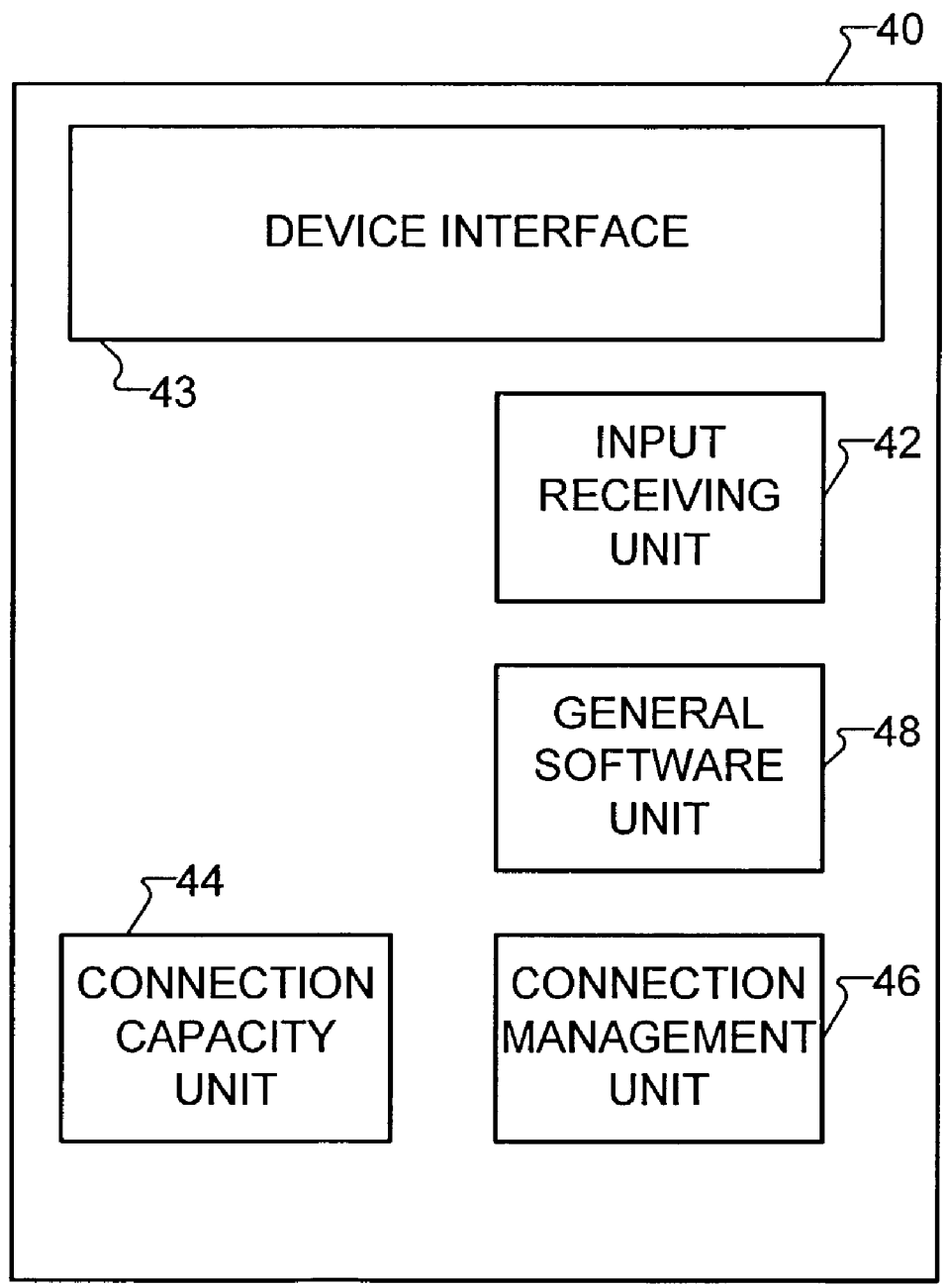
FIG. 3 is a simplified block diagram of a receiving terminal according to a embodiment of the present invention for use with the server of FIG. 2, FIGS. 4-8 are simplified screen displays of terminal units during various stages of email and file retrieval according to preferred embodiments of the present invention.

Reference is now made to FIG. 3, which is a simplified diagram of a mobile terminal for use with the system of FIG. 2. A mobile terminal 40 may be any kind of mobile terminal and may have capacity limitations depending on the type of terminal. Capability definitions, relating to the capacity limitations, may be stored in memory on the device. Thus, the capabilities may be known by the device and declared by it at logon time. As an alternative, the device simply announces its model type, enabling the gateway to determine the capability definitions from a terminal database. In a preferred embodiment an input receiving unit 42 is provided for allowing a user to input connection preferences via the device interface 43. A connection capacity unit 44 is optionally provided for monitoring connection quality and storing setting definitions corresponding to the measured connection quality. For example the connection capacity unit 44 may monitor the received data rate, which is relatively straightforward to implement. Additionally, the connection capacity unit may obtain the number of rejected packets, or a ratio of accepted to rejected packets.

In an alternative embodiment the connection quality measurements may be made at the far end of a cellular connection from the terminal.

A connection management unit 46 combines input from the user, from any definitions stored in the device and any connection capacity data that may be available, to form connection definition settings. The connection definition settings as assembled by connection management unit 46 are supplied, in a log-in procedure, to form the session ID referred to above, that maintains and defines the nature of the connection that is to be set up (i.e., creates a connection definition), at the server end. General device software is held in a general software unit 48.

The connection settings may include information from all or some of the above-mentioned sources and may include information obtained externally to the mobile terminal 40.

In an embodiment in which more than one source is used for providing data relating to the same setting definition, logic is preferably provided in the connection management unit 46 for combining the suggested settings from the different sources. Thus, the logic may take the data from the various sources into account by setting the connection to the lowest level represented by each of the data items.

Figure 4:
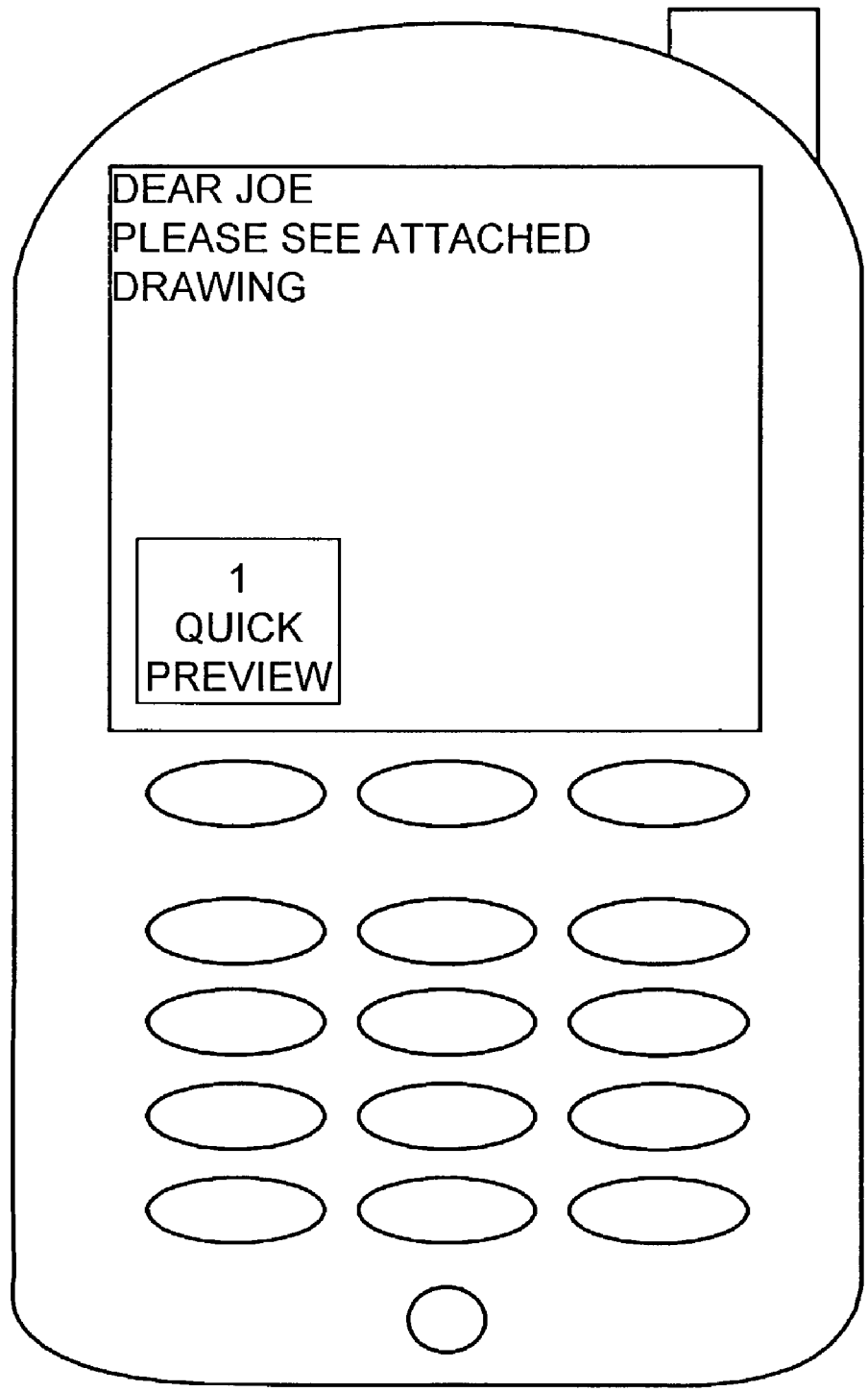

Reference is now made to FIG. 4, which is a simplified diagram showing a mobile terminal displaying an e-mail message as may be downloaded using an embodiment of the present invention. The message comprises the text of the message body together with a URL for attached data. The URL is preferably hidden from the user behind a selectable label or menu choice. For example, a 64 k image file can only be handled with difficulty by a mobile terminal, which is to say that, if downloaded and viewed, it would use up most of the terminal's resources. Thus, the present embodiment provides the alternative of allowing the user to download a message body containing one or more URLs that lead to the image, for example a first URL for the full image, a second URL for reduced resolution and a third URL for grey level only. In order to obtain the attachment the user selects the URL that corresponds to the way in which he wishes to view the image.

It will be appreciated that what is being described herein is a protocol for mail transfer, together with a discussion of various capabilities that the protocol provides. The user client, is free to implement any application in association with the protocol, in any way that he chooses. For example, the client may use an application that carries out certain decisions automatically, without taking advantage of the protocol's ability to provide a choice. Likewise the application may choose automatically in accordance with its own internal settings and as a further alternative it may offer the choice of retrieval method to the actual user interface. The specified user interface schemas described herein are merely exemplary, since the user interface can be modified in the client to suit any application or vendor.

Figure 5:
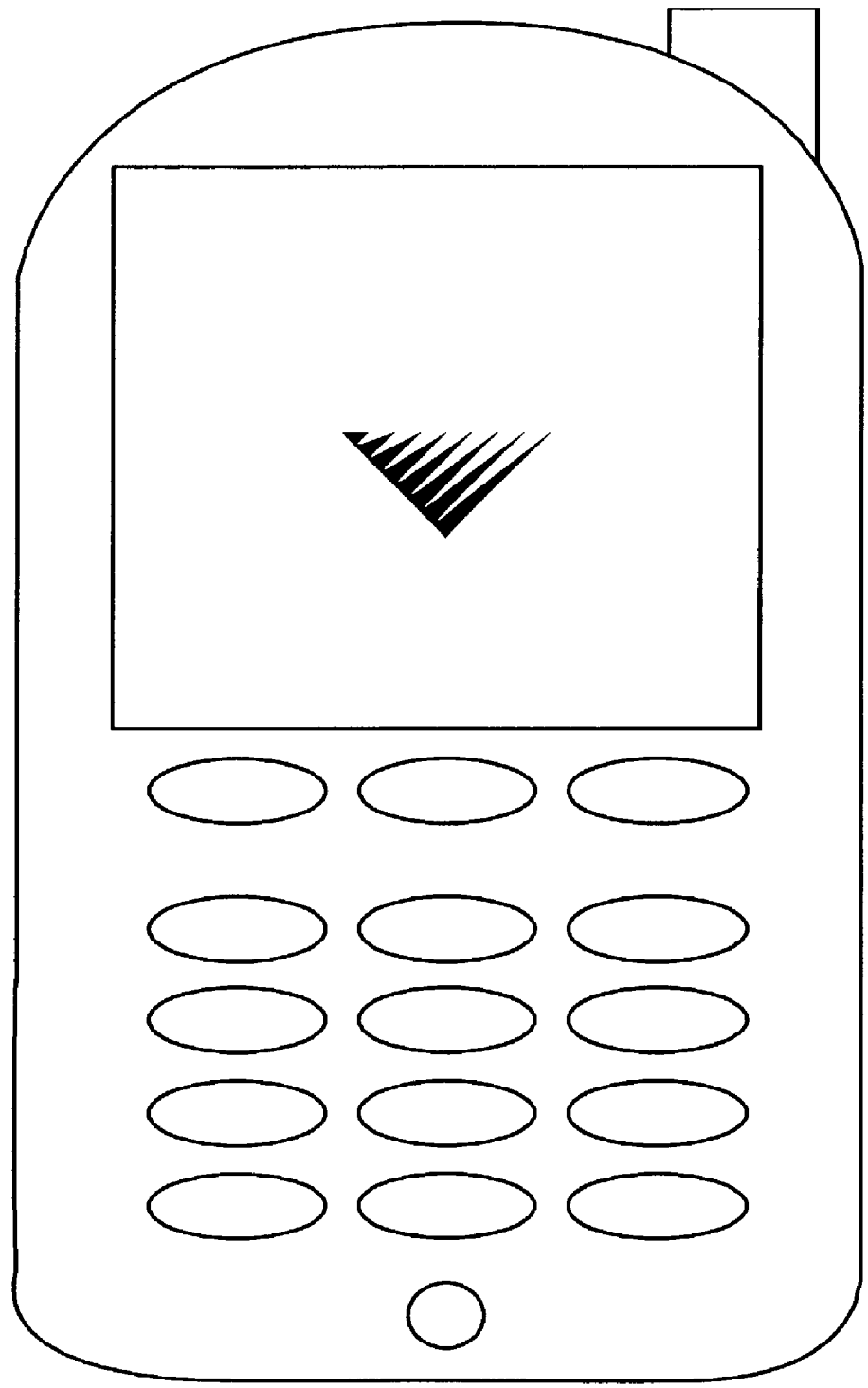

Reference is now made to FIG. 5, which shows, by way of example, the same terminal after the user has selected the URL. The converter has determined from the settings supplied by the login procedure that the terminal is a mobile terminal with a maximum capacity of 4 k and an ability to display low resolution gray level images only. The image has been converted into a 2 k gray level thumbnail or preview image.

Figure 6:
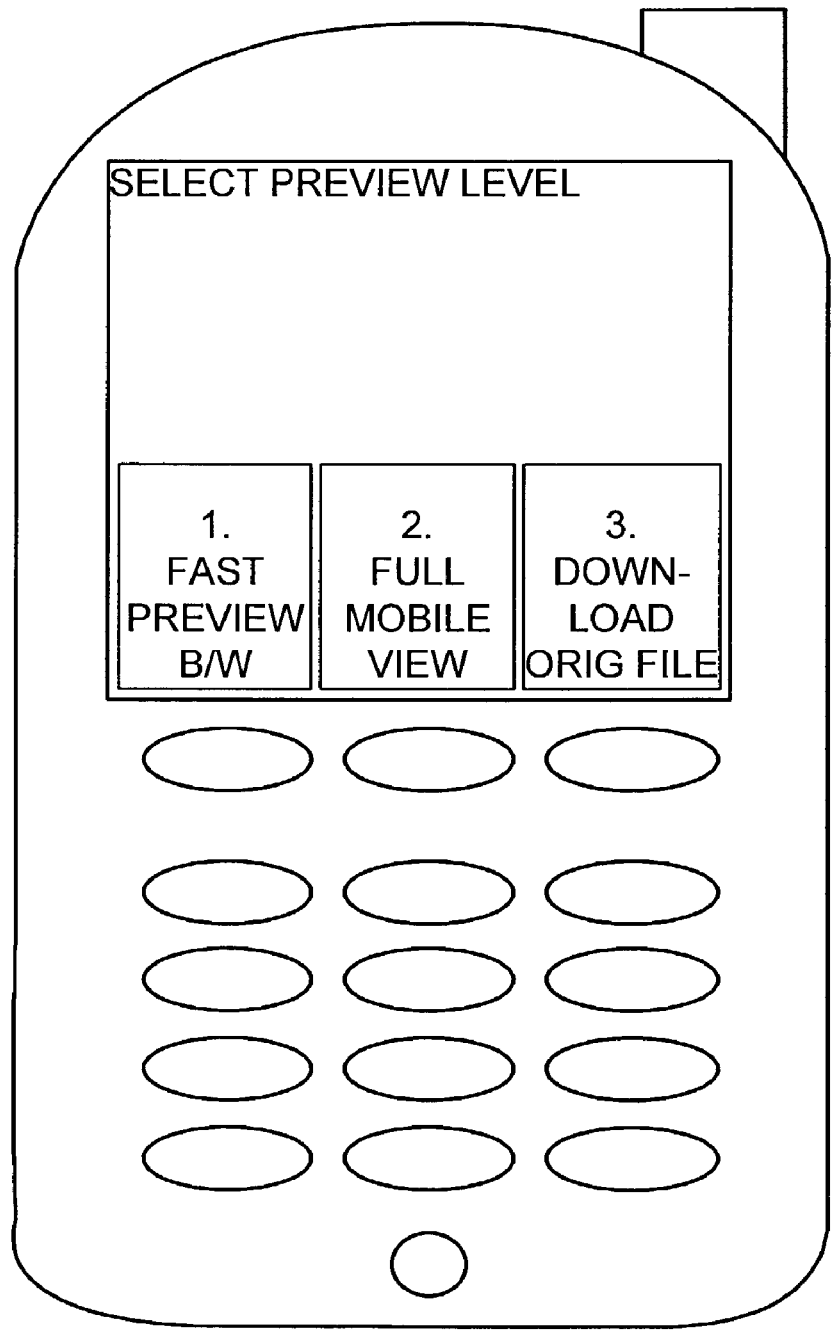

Reference is now made to FIG. 6, which is a simplified diagram showing a mobile terminal using a preferred embodiment of the present invention. In the embodiment, the user is not led directly to the multimedia file but is presented with a menu of different possible setting levels, corresponding to URLs, that the user is able to select from in order to obtain the file. To put it another way, the available modifications of the attachment are indicated to the client terminal by way of URLs (which may be displayed to the user or just used as a basis for generating a display of user options, as discussed more below). The user may use his knowledge of the capabilities of his terminal to select a level of preview that is appropriate. In a preferred embodiment the levels of preview shown in the menu are only those levels that the initial connection settings show to be possible for the current terminal. Likewise, for a video file, a series of options may be provided in a menu as follows: option1: play the movie, Option2: download reduced version, Option3: download the full original file.

Figure 7:
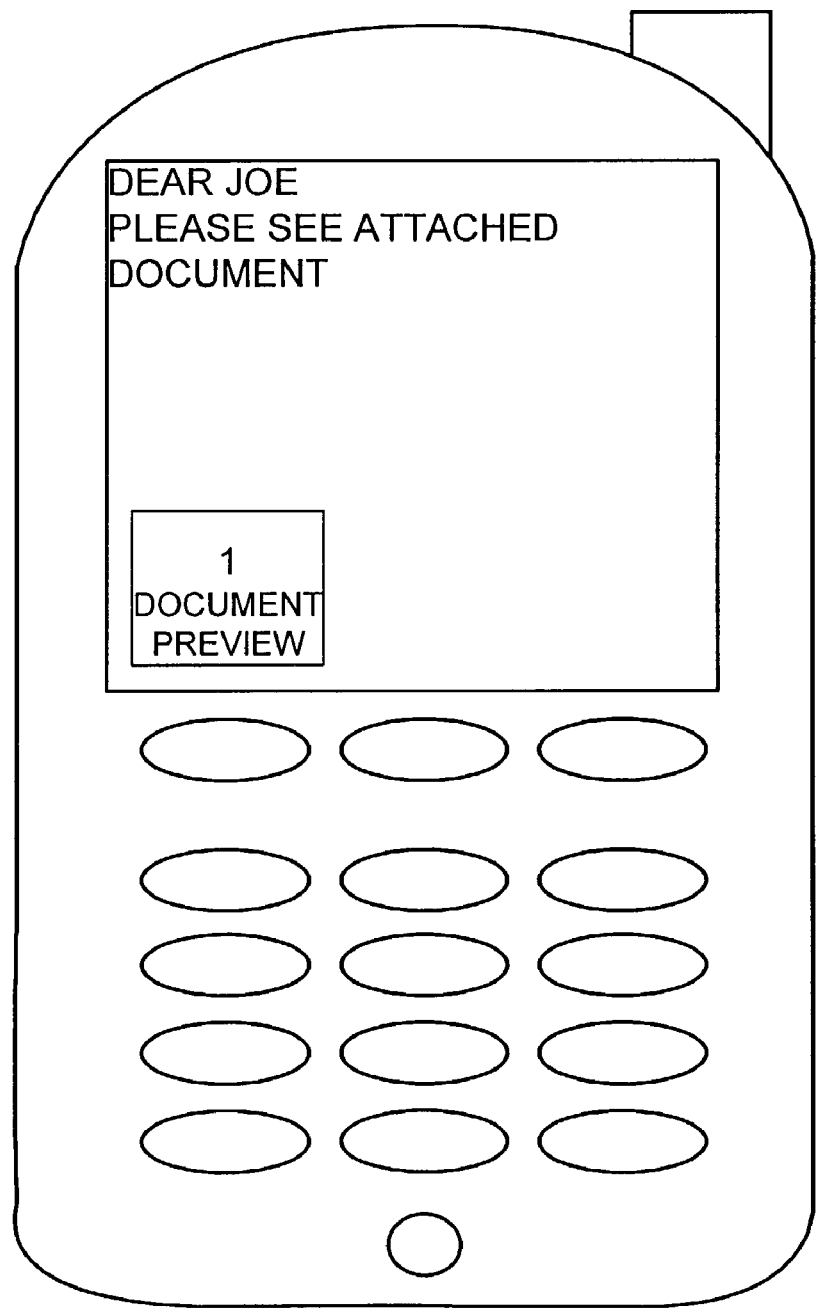

Reference is now made to FIG. 7, which is a simplified diagram of a mobile terminal with an e-mail message showing that there is an attached text document. The user is able to obtain the document by selecting the menu item corresponding to a URL that specifies a review version of the document. Selecting the menu item provides a preview version of the document which removes word processor specific formatting information and provides text which can be displayed with the capabilities of the mobile terminal.

Figure 8:
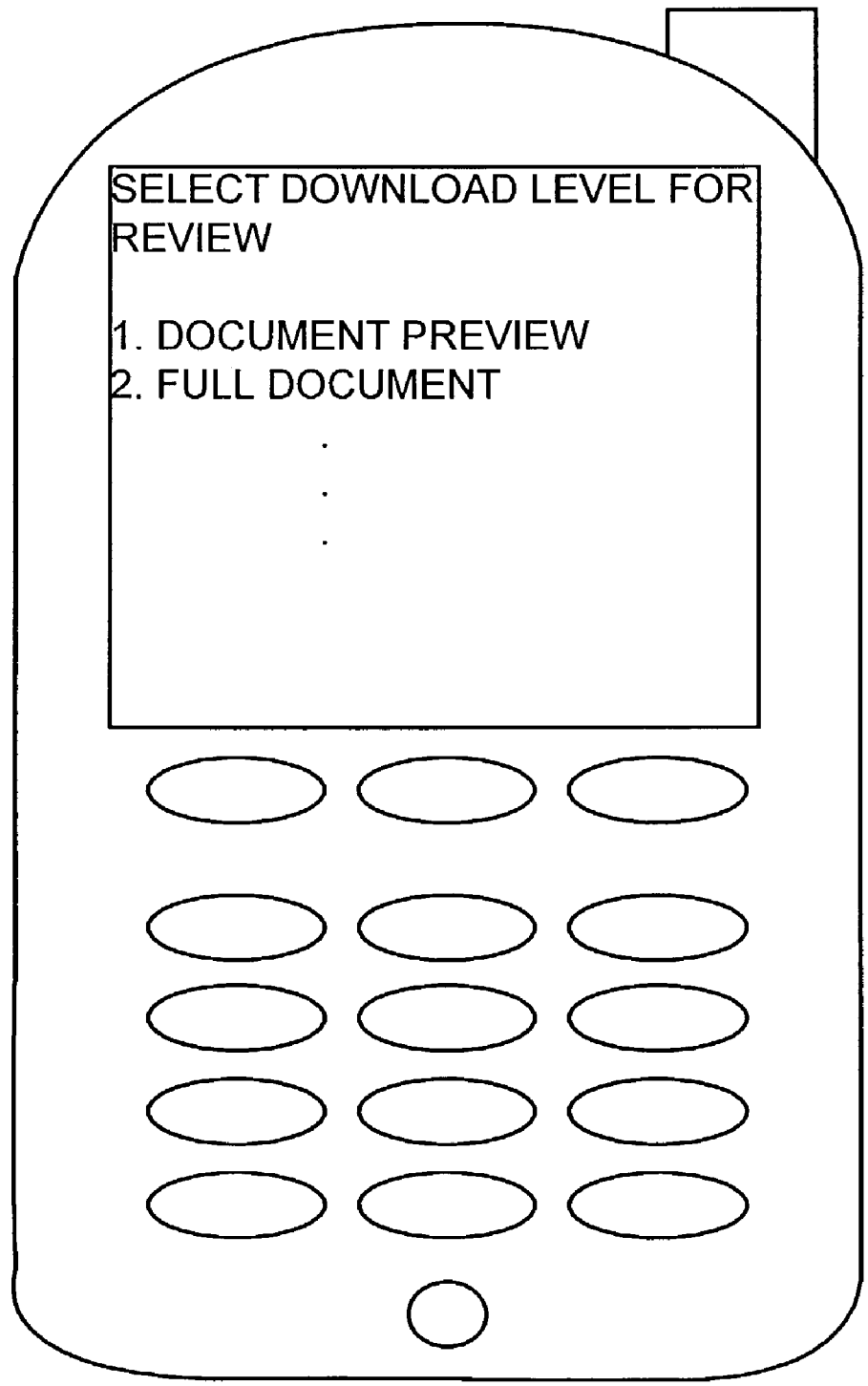

Reference is now made to FIG. 8, which is a simplified diagram showing a screen for the same e-mail message as that in FIG. 7, but as may be formed for a more sophisticated terminal unit that is able to support a word processor program. In the case of the more sophisticated terminal unit the user may usefully be given the choice of downloading a preview of the document, or downloading the document itself. The user knows that the full document takes longer to download but may also be aware that the full document is easier to work with. The user therefore has the opportunity to trade download and processing time for workability and speed. A typical set of options that may be provided for such a document is as follows: Option1: get properties, Option2: get table of contents Option3: Get a specific page number, Option4: get as text representation, Option5 download in Pocket Word format (It is noted that Pocket Word™ of Microsoft™ Corporation, is a reduced feature word processor used by many limited capacity devices), Option6: download original file. It will be appreciated that there are numerous other possibilities for download options that may be provided in given circumstances.

In general, the skilled person will appreciate that the URLs themselves are preferably hidden from the user interface. Thus the mail screen may be provided with a look and feel that does not expose the actual implementation, but rather gives the look and feel of regular email. Exposing the URLs to the user interface may also make security breaches easier.

Figure 9:
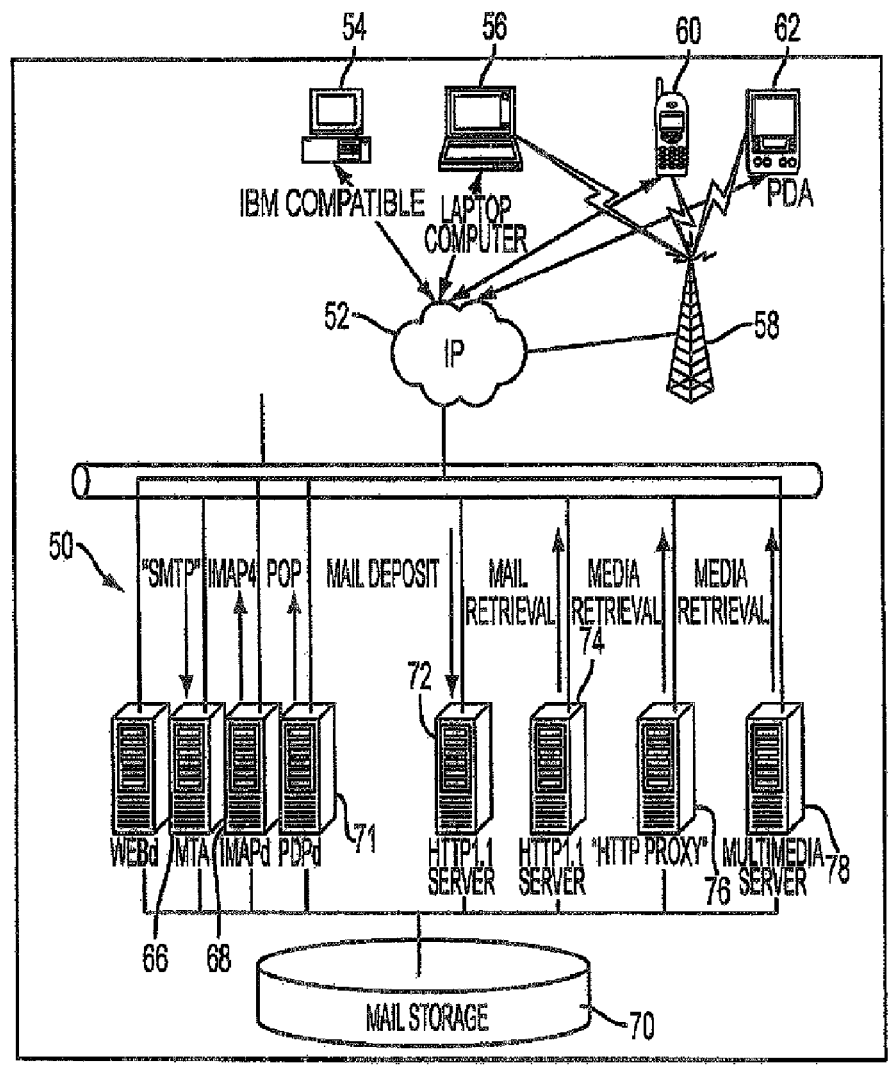
FIG. 9 is a simplified schematic diagram of a mail server arranged to provide an HMAP connection according to embodiments of the present invention

Reference is now made to FIG. 9, which is a simplified block diagram showing an arrangement of servers for realizing the block diagram of FIG. 2.

In FIG. 9, a mail server system 50 is connected via an IP-protocol-based link 52 to different types of user terminals, including a PC 54 and a laptop computer 56. The IP based network is connected to cellular network 58 through which additional user terminals are connected including mobile telephone 60 and personal digital assistant 62. The laptop computer 56, as indeed other devices, may be capable of connecting via both routes.

It will be appreciated that the servers shown in FIG. 9 are logical servers, which do not necessarily correspond to actual hardware servers.

The mail server system 50 preferably comprises a mail storage area 70 for storing incoming mail with attachments. SMTP server 66, IMAP4 server 68 and POP server 71 support the respective connection protocols. A mail deposit server 72 receives mail from the terminals for sending over the Internet. In the present context it is noted that the deposit server 72 serves as a media storage area or media bank, so that attachments may be stored therein. Subsequently, if a user wishes to forward the attachment, he proceeds in the normal way to forward the corresponding e-mail from his client, but the attachment is not downloaded from his client to the network. Rather, the attachment is forwarded directly from the network. Thus the reply to, and forwarding of, messages becomes possible without needing to upload or download attachments from the client. Rather the attachments are kept within the media bank, at the server, and sent on from there, reducing traffic at the wireless client to server stage of the link considerably.

It is noted that the email server may be implemented in numerous ways but may preferably include protocol access points, that is points of entry for connections using the presently discussed embodiments and mail storage.

The embodiment of FIG. 9 thus provides an email server that may be optimized for low-bandwidth low-power terminals, but on the other hand can equally well be optimized, simply by the use of different settings, for broadband connections such as TV digital receivers for Cable and Satellites.

The skilled person will appreciate that the mail deposit server and associated procedure are unmodified in the preferred embodiments since it is not necessary to identify a terminal that is depositing mail. A mail retrieval server 74 allows the terminals to retrieve their mail. As described above, the mail that is retrieved may have media attachments replaced with pointers or URLs specifying matching retrieval locations, that allow users to retrieve their own attachments as required. Beyond being pointers, the URLs may contain selected settings for specifying specific file conversions for the attachments.

In addition to the servers above-mentioned, additional media retrieval servers 76 and 78 are provided. The servers obtain the connection settings and use the settings to ensure that the attachments are modified appropriately for the settings. It will be appreciated that any number of servers may be used as needed to provide the required quality of service level for the respective load. It will also be appreciated that components in the figure are logical units and as such may be implemented in software or in hardware as desired. In software they may be co-hosted within the system in a manner appropriate to the system's size.

Figure 10:
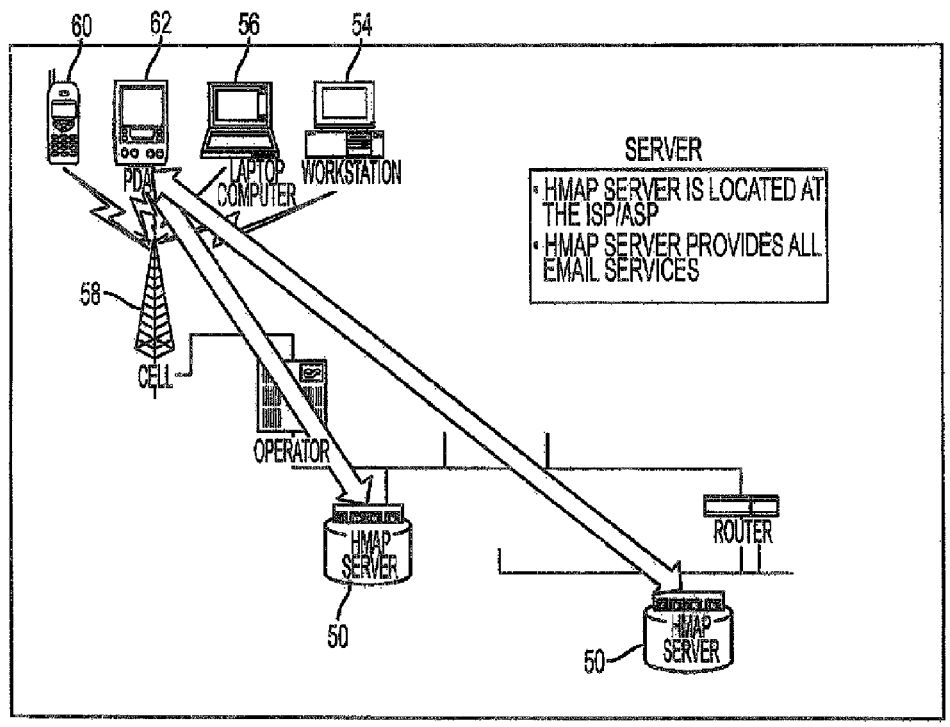
FIG. 10 is a simplified diagram showing deployment of the HMAP system as an email server optimized for low-power and low bandwidth terminals.
Figure 11:
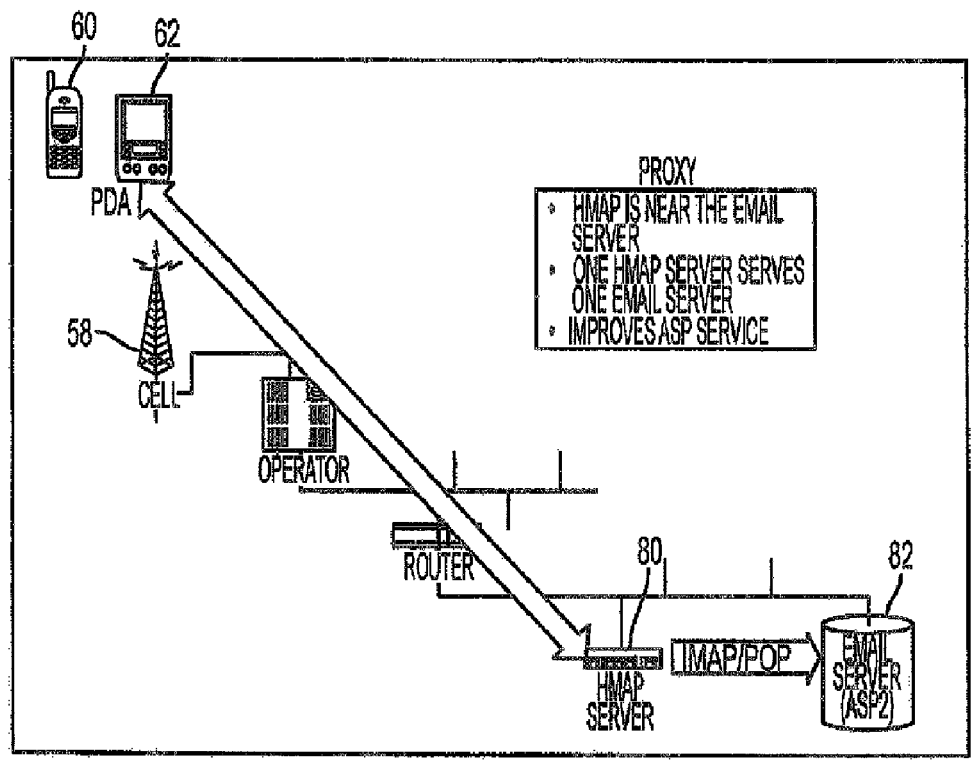
FIG. 11 is a simplified diagram showing deployment of the HMAP server as a proxy to a conventional email server.
Figure 12:
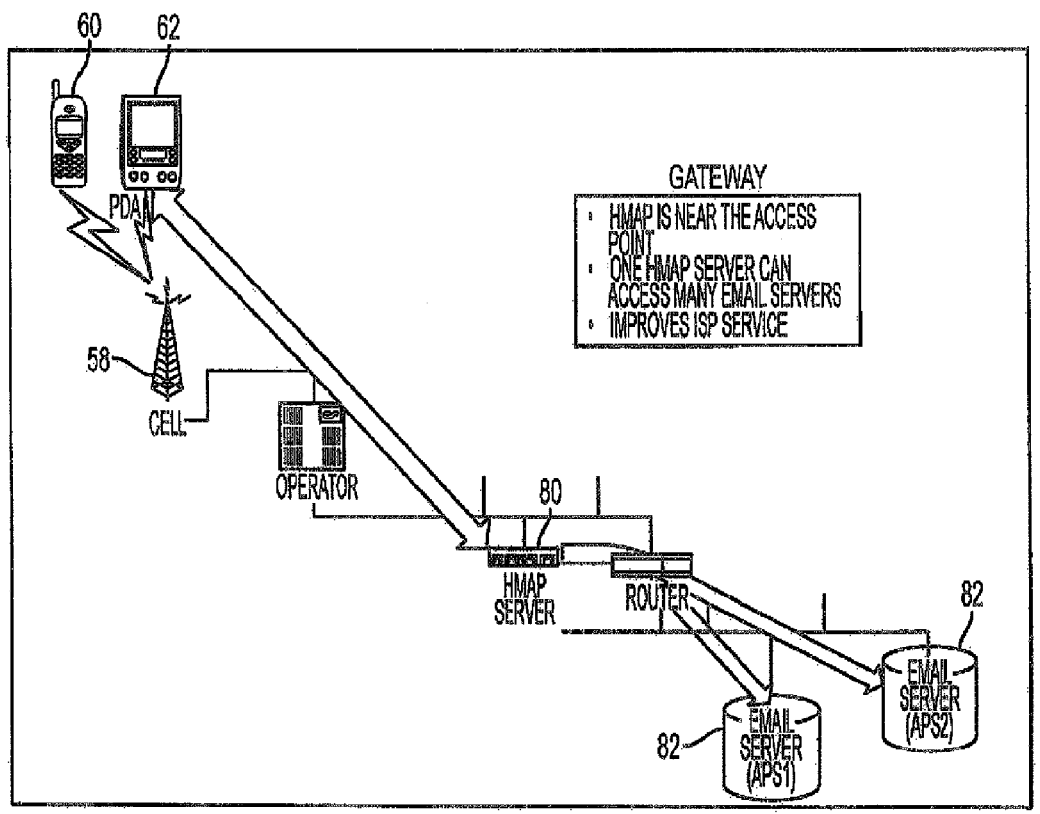
FIG. 12 is a simplified diagram showing deployment of the HMAP server as a gateway server.

Reference is now made to FIGS. 10-12, which are simplified schematic diagrams showing possible deployment schemes of the above embodiments. Parts that are the same as those in previous figures are given the same reference numerals and are not described again except as necessary for an understanding of the present embodiment.

FIG. 10 shows a first deployment scheme for embodiments of the present invention. In the deployment scheme of FIG. 10, the system is deployed as a modified e-mail server. That is to say, HMAP is integrated into an e-mail server to provide an integrated HMAP e-mail system. Preferably such integration provides a complement to existing access protocols. A server according to the present embodiments, here denoted as an HMAP server 50, is located at the ISP or ASP and provides full email service. The connections are labeled HMAP as they are based on the above-described protocol.

FIG. 11 is a simplified diagram which shows a second deployment scheme which may be used as an alternative to that of FIG. 10. FIG. 11 shows an HMAP server 80 provided as a proxy server to complement a conventional e-mail server 82. The proxy server 80 and the e-mail server 82 are linked using an IMAP or POP connection, or in a small percentage of cases a proprietary protocol. The e-mail server 82 is preferably a standard e-mail server. The proxy server 80 complements the standard email capabilities. The email itself is preferably accessed using existing protocols and the proxy server uses the settings or definitions obtained to modify media files as they are requested. A single HMAP server is preferably assigned to a single email server to enhance the capabilities of that specific email server.

Referring now to the arrangement of the HMAP server as a proxy server to more than one e-mail server, it is noted in this connection that the proxy server may provide optimized interfacing for specific email servers, for example so as to use the respective e-mail server's proprietary interfaces or APIs. That is to say, in a proxy arrangement, the HMAP server can provide optimizations specific to the mail server in use. The optimizations relate to non-standard features known to the e-mail server. However, in the general case, non-standard features of the e-mail server are not known to the outside and thus only standard interfaces can be used.

FIG. 12 shows a gateway-based deployment of the system. The HMAP server 80 is located at or near (in network topology terms) the mobile IP access point, and a single HMAP server is able to access and modify data from a plurality of different e-mail servers, thereby improving the overall ISP or Telco (mobile telephony) service. The HMAP server is able to modify files in this way, and intervene in the login process, as long as the mail server exposes access protocol data. Thus all the users of a given ISP may experience the enhancements of terminal recognition regardless of what mail server they may use.

Figure 13:
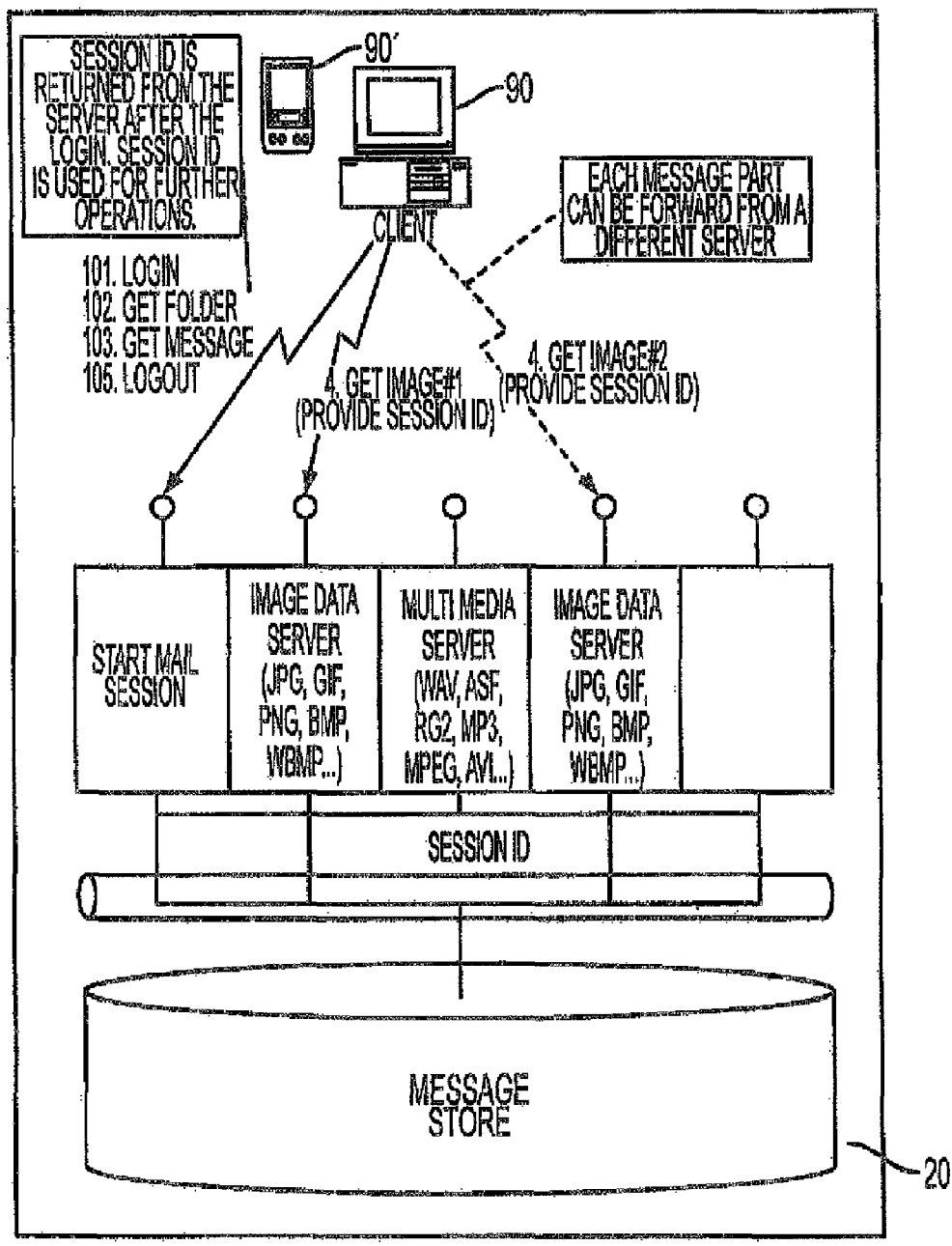
FIG. 13 is a functional block diagram showing data exchanges that occur during the different stages of login and mail and file retrieval of a mail session according to the above embodiments.

Reference is now made to FIG. 13 which is a simplified diagram showing a user terminal 90 connected to a server 92 according to an embodiment of the present invention and showing in schematic form the data exchanges that occur during login and downloading. Parts that appear in earlier figures are given the same reference numerals and are not discussed in detail again except as needed for an understanding of the present embodiment. As discussed above, the HMAP Gateway may provide capabilities for composing, replying to and forwarding email messages, and further providing mail handling enhancements as discussed above. A terminal 90 begins a mail session by logging in 101 to start a mail session. A session ID is created for subsequent operations. The session ID may subsequently be used to continue the session in the event that the physical connection is lost. The session ID may be located in association with the server and it may, in one embodiment, be returned to the user-client subsequent to the login, for later use as will be described below.

The login is followed by the user receiving a welcome screen from which he is given access to his mail or any other folder 102. From the mail folder he is able to download his messages 103, however he does not at this stage download any attachments. The messages preferably contain URLs for the file attachments, which URLs may offer a choice, as described above, possibly including a preview, a reduced file adapted for his mobile terminal and a full download of the file. The file attachments are obtained after providing 104 the session ID obtained above. In the diagram, different servers 94 ... 100 are provided for different file types. As long as the session ID is still available, meaing that the user has not logged out 105 of the session, new HTTP connections can be created. Thus the session is not lost merely by interruption of the socket. The session ID may be stored as a cookie-like entity, as discussed above, which may be exchanged between the server and the client. As each new task such as downloading a specific attachment is begun, the session ID is sent from the user to the relevant server to establish a socket for the task and then the session ID is preferably returned to the client ready for a new task. The session ID contains a current state of the session, for example it may indicate that the session is undergoing log-in, is carrying out a fetch headers operation or the like. The session ID may be used internally to synchronize the various servers to treat the user requests consistently.

Figure 14:
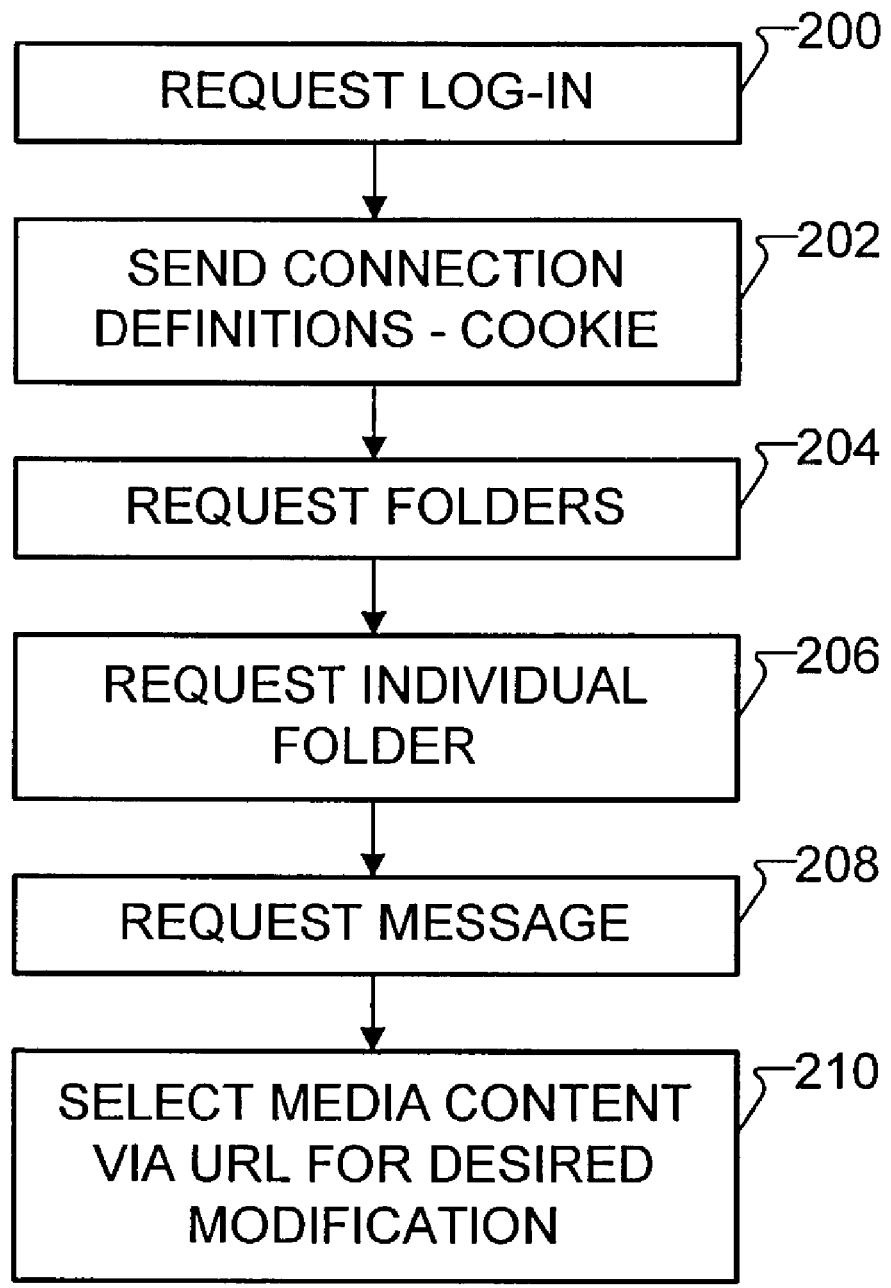
FIG. 14 is a simplified flow chart of an exemplary mail session according to the above embodiments, from the point of view of the receiving client.
Figure 15:
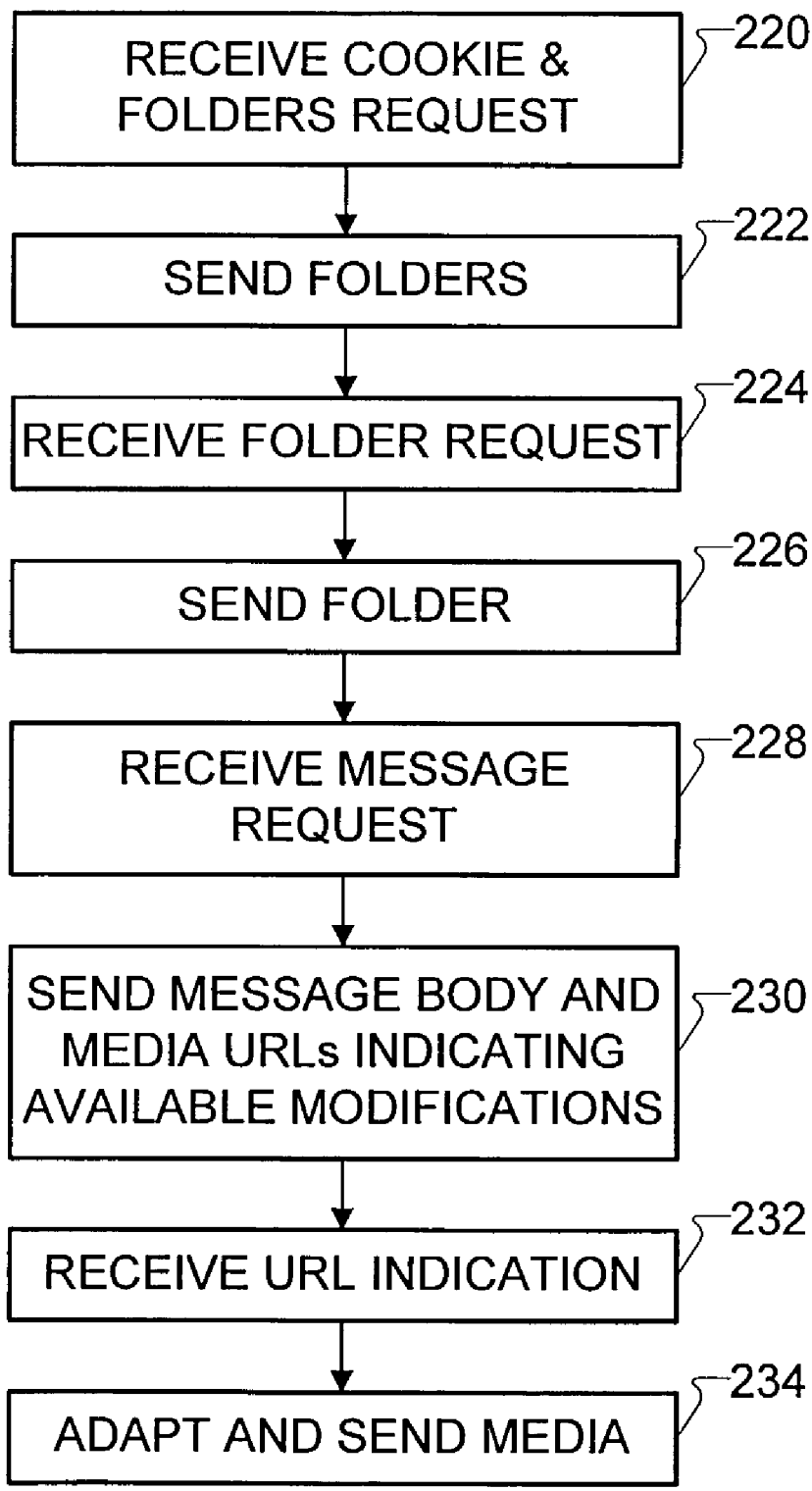
FIG. 15 is a simplified flow chart of an exemplary mail session according to the above embodiments from the point of view of the server supporting the mail protocol.

Reference is now made to FIGS. 14 and 15, which are simplified flow charts showing various stages in the process of logging in and downloading mail with attachments, from the points of view of the user client and HMAP server respectively.

In FIG. 14 a connection request is received 200 at the server. Connection definition settings may be requested or received automatically 202 and a connection is set up with a session ID. The session ID preferably contains a connection definition corresponding to the connection definition settings for the connection, or the connection definition may be stored in memory in any other way, but preferably such that it may be obtained with the session ID.

Once logged in, the user client sends 204 a 'get folders' request to the mail server to receive the list of folders. If a target folder is already known then the 'get folders' request may be omitted. The server returns the list of folders and the client requests 206 an individual folder. The server responds to a request regarding an individual folder by providing a list of the messages in the folder. The client then issues a request 208 for an individual message and the server analyzes the requested message. The server sends back a full message structure specifying attributes of the message and detail of media content and operations available for the content given the client settings and preferences.

Subsequently in the session, the user client issues 210 a request concerning the way in which it wants to receive the file by activating the appropriate URL, or associated menu item. The request is detected by the server, and the file is modified accordingly.

Referring now to FIG. 15, and the same operation is described from the point of view of the server. A session ID is received together with a folder list request 220. Provided the session ID appears to be authorized to view the requested folder, then the requested folder list is sent 222 to the requesting terminal. Then a request is received 224 for an individual folder, and the folder is sent 226. An individual message request is then received 228 and the body of the message is sent 230 together with a menu of attachments and allowable adaptations thereof, as discussed in detail above. A URL request or indication is received 232 from the terminal, which URL specifies a given attachment and possibly also an adaptation of that attachment, in response to which 234 the adaptation is carried out and the attachment is sent to the requesting terminal.

In the procedure described above, the user client is able to download a message as the result of several interactions. It is also possible to provide message retrieval in a single stage. In a preferred embodiment of single stage message retrieval, the message to be retrieved is predefined, for example as the newest message in the folder, a message with a push notification, or a specific message that has not been synchronized between the client and the server, as will be discussed below. The client, who is already logged in, issues a 'get message' request which contains the session ID, folder and message identification details. The client may, as desired, request the text body alone, or the text together with all the associated media. If the media is requested, then it is sent according to the default settings of the receiving client terminal. Nevertheless, the user may still override the default settings. For example, if the client terminal can receive large images, then the terminal may still request a small preview/thumbnail view of the image The server internally carries out the operations of processing the request, matching the request with the client terminal default parameters contained as part of the login details and conversion of media files as necessary. The session ID is then returned to the receiving client for future use.

A preferred embodiment of the present invention provides for the possibility of retrieving all media items in a message in a single request, thereby reducing the number of round trip delays to be involved in the download. Thus, it is not necessary for a user wanting all of a large number of media items in a message to have to select each one individually. Preferably a synchronization operation is also supported. The synchronization operation is preferably initiated by the receiving client terminal and involves retrieving the message bodies or contents in a single retrieve operation for all or some of the messages in the selected folder. In fact, such a synchronization operation may be carried out without any special intervention from the HMAP-supporting gateway and the client may store data offline and carry out synchronization at will, by sending automatic synchronization requests. Specific types of requests within the HTTP/1.0 protocol are discussed below.

It will be appreciated that the operation flow may be implemented as several request-response round trips, or as one request specifying all the login, folder message parameters and therefore leading directly to the message or message list in a single step. Such a direct approach avoids round trip delays that increase the response time.

In a preferred embodiment, the transport protocol that is used is HTTP/1.0. Mail session operations, such as retrieval of the message body, are preferably implemented using an HTTP POST request. Media retrieval operations are initiated with the HTTP GET request, at least for single file retrieval operations, and may also be initiated with the HTTP POST request for multiple file retrieval operations. Default encoding for message retrieval operations is text or xml. There is no overall default encoding for media. Rather, media files are preferably encoded in accordance with the media type of the file.

There is thus provided a system in which a data transfer server, in particular but not necessarily a mail server, is able to identify the capacity and/or capability of a receiving terminal or an intermediate connection and is able to modify requested files to suit the available capacity and/or capability. Likewise, there is provided a system in which a data transfer session identification is retained independently of a socket connection, so the session is not dependent on the socket. Furthermore, the connection definition settings are stored as a connection definition, either as part of the session ID or in another memory location.

Figure 16A:
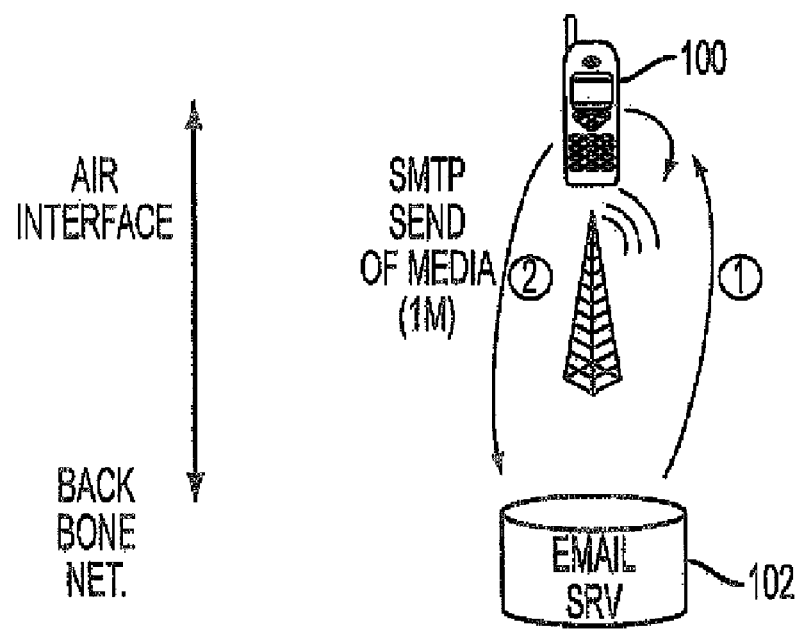
FIGS. 16A and 16B are comparative block diagrams showing forwarding of an e-mail having attachments, both according to the prior art and according to a presently preferred embodiment.
Figure 16B:
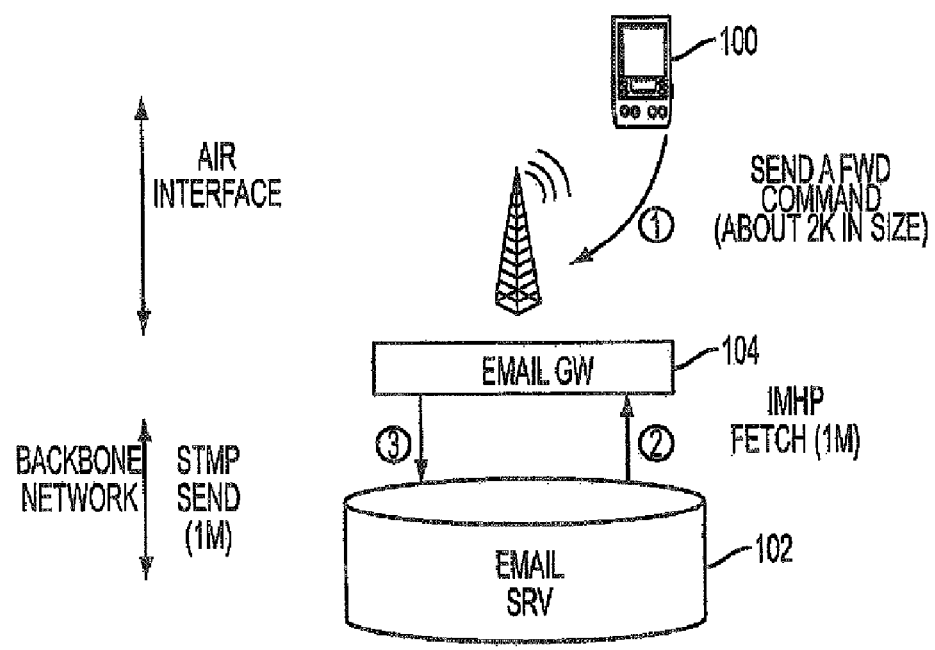

Reference is now made to FIG. 16, which is a simplified comparative block diagram which summarizes certain contrasts between the present embodiments (FIG. 16A) and the prior art (FIG. 16B). In FIG. 16A, a mobile telephone 100 is linked via an air link and backbone network directly to an e-mail server 102. The user receives an e-mail with an attachment and forwards it, leading to a transfer of 2 MB of data over the airlink.

By contrast, in FIG. 16B the mobile telephone 100 is interfaced to the e-mail server 102 by an e-mail gateway 104. The mobile telephone user is able to download the attachment or not as desired, but in any case the attachment is stored at the gateway 104 and can be forwarded by issuance of a forward command.

Although gateway 104 is shown as an e-mail gateway, it is also possible to provide a multiple application gateway, using a single protocol to combine several applications, such as Email, Address Book, Calendar, Tasks and News. Such a combined uniform protocol can hide the actual different (and possibly non standard) protocols that implement every application in an application suite protocol, simply by treating the different content as attachments to a body message that corresponds to the specific application.

Accordingly, there is provided a protocol for handling electronic mail between a receiving client and a mail server, which protocol is particularly suitable for limited bandwidth connections and limited capacity receiving terminals, and which protocol is capable of supporting message retrieval, compound media retrieval, message composition, reply and forwarding of mail, message deletion and synchronization.

Essentially, the protocol defines an interaction between the following two entities: a mobile email gateway and a mobile email client. The mobile email client can be implemented by software that can be hosted on a client terminal in association with a browsing capability. The client preferably includes the following capabilities: the ability to access the protocol server or gateway in order to obtain email data, the ability to identify a terminal type, including the ability to respond to a request to identify a terminal type, to provide a user interface which is able to present data and user download, forwarding and reply choices in the simplest and most efficient manner possible, and the ability to select media for download and to select the manner of retrieval, either automatically or using manual intervention, in particular the ability to screen out unwanted downloads that could tie up resources.

In message reply and forwarding, it is common to include message parts, such as file attachments, that have already been sent to the terminal with, or as a result of, previous messages. In the cases of reply and forwarding, the protocolallows a server, by enabling it to check messages for URLs, to ascertain whether the reply or forward message includes any message parts, such as file attachments, which are still stored as attachments at the server. If so then the material from the server is used and an extra download from the sender is avoided.

The mobile gateway may be provided as software that is co-hosted with the mail server as an extension to the access protocol, or it may be a separate system operating as a gateway and possibly working in conjunction with several email servers. The mobile gateway may access the email server (or a proxy), determine connection capabilities, desired settings etc. and finally adapt media to be downloaded, to match the connection capabilities and the desired settings. The protocol divides into three separate tasks: firstly mail session invocations and the downloading of mail messages, secondly media retrieval invocations and the adapting and downloading of media content. Thirdly the protocol makes a session independent of individual sockets. Mail session invocations handle login, folder setting, obtaining the message envelope, message composition, message deletion, and message content retrieval, which is to say retrieval of the message body, and media retrieval operations comprise adaptation of the media files and their retrieval. The media files themselves preferably remain unchanged but the content is adapted, according to the requirements of the receiving terminal, and the adapted content is downloaded.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof, which would occur to persons skilled in the art upon reading the foregoing description.

There is claimed:

1. An e-mail server session connection method, comprising:
    receiving a connection request from a receiving client and establishing a session;
    receiving one or more connection definition settings from said receiving client when said session is established;
    establishing a connection with said receiving client within said session;
    presenting a plurality of URLs during said session, wherein said plurality of URLs represent a single attachment that may be processed via different methods, and
    based on said connection definition settings, associating a connection definition with said session, thereby enabling reactivation of said session upon deactivation of said connection,
    wherein said connection definition settings obtained when said session was established include at least one definition relating to a connection bandwidth of the connection with the receiving client.

2. A method according to claim 1, wherein said connection definition relates to a connection bandwidth.

3. A method according to claim 1, wherein said connection definition relates to a user client terminal capacity.

4. A method according to claim 1, wherein said connection definition relates to a user preference.

5. An e-mail server connection method, comprising:
    receiving a connection request from a receiving client and establishing a session;
    receiving one or more connection definition settings from said receiving client obtained when said session is established;
    establishing a connection with said receiving client;
    associating a connection definition, based on said connection definition settings, with said connection to said receiving client;
    modifying a multimedia file to be sent via said connection according to the associated connection definition to produce modified files, wherein the modified files represent the file modified according to different connection definitions; and
    checking statistics for said media file to be downloaded, and sending to said receiving client a list of possible modifications to said multimedia file based on said connection definition,
    wherein said connection definition settings include at least one definition relating to a connection bandwidth of said connection with said receiving client.

6. A method according to claim 5, further comprising sending said list as a series of user selectable list items.

7. A method according to claim 6, further comprising: receiving a selection from said receiving client of one of said list items, modifying said media file in accordance with said selection, and sending said modified media file to said receiving client.

8. An e-mail client connection method comprising:
    sending a log-in request to an e-mail server to set up a connection with said server;
    sending one or more connection definition settings to said server in said log-in request to define multimedia file properties;
    modifying multimedia files sent to said client over said connection; and
    generating a display of user options for each multimedia file of the multimedia files according to said one or more connection definition settings,
    wherein said connection definition settings include at least one definition relating to the connection bandwidth of the connection with said client.

9. A method according to claim 8, wherein said connection definition settings relate to a user client capacity.

10. A method according to claim 8, wherein said connection definition settings relate to a user preference.

* * * * *

UNITED STATES PATENT AND TRADEMARK OFFICE
CERTIFICATE OF CORRECTION

PATENT NO. : 8,407,292 B2  
APPLICATION NO. : 10/206954  
DATED : March 26, 2013  
INVENTOR(S) : Grosu Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this  
Sixteenth Day of December, 2014

Michelle K. Lee  
*Deputy Director of the United States Patent and Trademark Office*